April 26, 1932. W. R. DARNELL 1,855,625
FURNITURE GLIDE
Filed Oct. 2, 1929
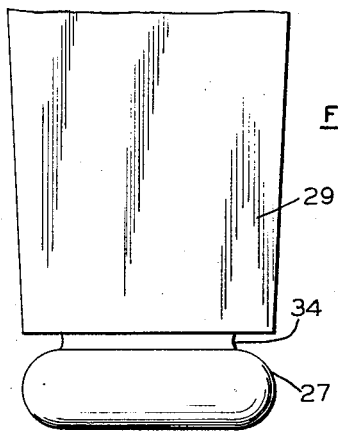
FIG. 1.
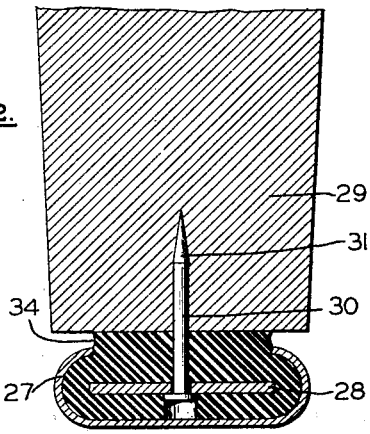
FIG. 2.
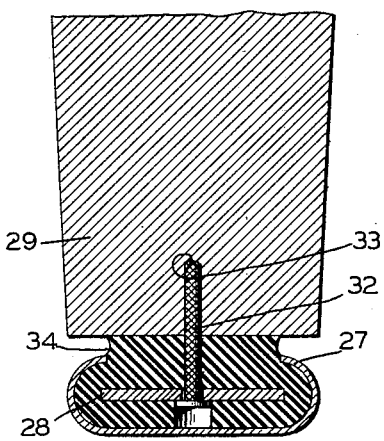
FIG. 3.
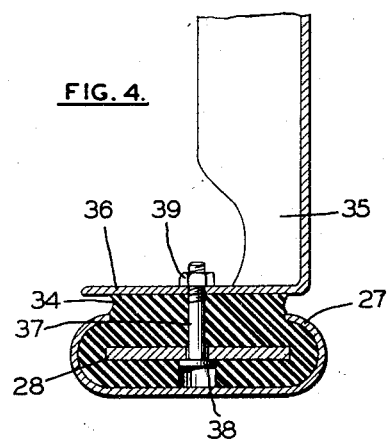
FIG. 4.
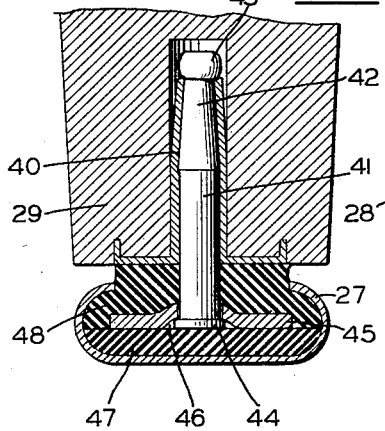
FIG. 7.
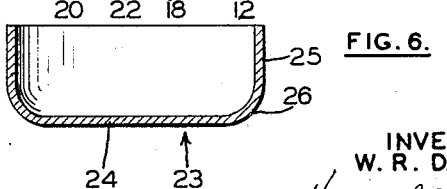
FIG. 5.
FIG. 6.
INVENTOR
W. R. DARNELL
BY *Hazard and Miller*
ATTORNEYS Patented Apr. 26, 1932

1,855,625

UNITED STATES PATENT OFFICE

WALTER RALEIGH DARNELL, OF LONG BEACH, CALIFORNIA, ASSIGNOR TO DARNELL CORPORATION, LTD., OF LONG BEACH, CALIFORNIA, A CORPORATION OF DELAWARE

FURNITURE GLIDE

Application filed October 2, 1929. Serial No. 396,832.

My invention pertains to furniture glides.

An object of my invention is the construction of furniture glides which give a quiet action when furniture is moved over a floor and in which there are no metallic structures making a direct connection between the sliding surface of the glide and the furniture and therefore any noise made by the sliding element is absorbed.

A further object of my invention is a furniture glide which has a resilient mounting on the furniture and in which a certain amount of angular action may take place such as on the tilting of chairs or the like having my glides on the legs.

A further object of my invention is forming a glide with a metallic member contacting with the floor and having a resilient body mounted therein, this resilient body being highly compressed and attached to the furniture in such a manner that but a small amount of the resilient material such as rubber is exposed to the atmosphere. This construction and manner of mounting when rubber is used as the resilient material, greatly reduces the deterioration of the rubber from oxidization as the rubber which is enclosed in the metallic bearing structure of the glide is prevented from oxidization and there is only a small annular surface of the rubber immediately below the leg of the furniture which is left exposed.

Another object of my invention in one form thereof, is the construction of a glide having a holding member for attaching to the furniture, this holding member having a head engaging a plate or washer-like structure imbedded in the resilient material enclosed in the sliding portion of the glide. This holding member is adapted to be attached to the furniture and the plate or washer is of sufficient size or diameter so that it can be pulled out of the inwardly pressed or turned upper edges of the metal shoe of the glide.

In this connection the metal plate or washer may be molded directly in the resilient composition, this being usually rubber; the composition also having a hole for fitting of the holding element such as a nail, bolt or the like.

In several forms of my construction a feature of my invention is that the head of the holding element such as a nail or bolt is brought out of contact with the shoe of the glide which contacts with the floor, this head bearing against the metal plate or washer imbedded in the resilient composition. This therefore eliminates any chance of a metallic connection being made between the shoe of the glide and the body of the furniture, thereby greatly reducing the noise made in moving the furniture over the floor.

In this connection a further feature of my invention is the employment of nails in which the glide may be attached to furniture legs by hammering on the bottom of the shoe. This action brings the head of the nail in direct contact with the inner surface of the shoe, drives the nail into the leg of the furniture and compresses the resilient composition. When the nail is hammered sufficiently tight the expansion of the composition draws the head of the nail away from the inner surface of the shoe engaging the underside of the head with the washer, thus bringing the nail out of contact with the shoe.

Although the resilient filling has a socket therein to accommodate the nail head, the expansive effect of the filling material is sufficient to maintain the nail head out of contact with the shoe.

A further feature of my invention is utilizing a stem such as a caster stem in the glide, this having a head engaging a washer imbedded in the resilient filling. In this case it is preferable to have the filling in two layers, the lower layer separating the head of the stem from the shoe of the guide. In this type the stem may be fitted in a caster socket on the leg of the furniture.

My invention in its various forms is illustrated in the accompanying drawings in which, Figure 1 is an elevation of my glide attached to the leg of an article of furniture;

Fig. 2 is a vertical section through the glide and a leg of a piece of furniture, showing a smooth surfaced shaped pointed nail as the holding element;

Fig. 3 is a view similar to Fig. 2, showing a rough surface blunt pointed nail as the holding element;

Fig. 4 is a vertical section through a metal leg illustrating the glide attached by a bolt;

Fig. 5 is a vertical section of the resilient filler of the glide, also of the washer and illustrating a nail in elevation;

Fig. 6 is a vertical section of the cup-shaped shoe before compressing the resilient body therein;

Fig. 7 is a vertical section of a further modification, showing a caster type of stem mounted in the glide and fitting in a caster socket.

Referring first to Fig. 5, this shows the resilient filler material 11 which is usually made of a high grade rubber and has usually a flat base 12, a cylindrical side wall 13, a flat annular shoulder 14, a second cylindrical surface 15 of lesser diameter than the surface 13 and a flat top 16. This rubber is provided with a nail hole 17 therethrough, there being an enlarged socket 18 at the bottom for the head of the nail. A metal plate-like washer 19 is imbedded in the body by being molded therein in the process of molding the rubber. In order to position this washer evenly, I employ pegs in the molding operation which support the washer above the bottom of mold and leave small indentations 20 leading upwardly from the bottom surface 12 of the rubber to the washer. This however, is not detrimental to the action of the rubber.

A nail or other holding element 21 fits in the nail hole with the head 22 of the nail occupying part of the socket 18, the undersurface of the head of the nail fitting against the underside of the washer. The shoe 23 of the glide is a metal structure having a base 24 to slide on the floor and sides 25. There is preferably a curved shoulder 26 joining the base and the sides. The resilient body material such as rubber with the washer and nail or other fastening, is inserted in this cup-shaped shoe. Then the upper edge of the shoe is pressed inwardly as indicated at 27. This compresses the rubber, the upper edges of the shoe being adapted to fit over the annular flat surface 14. It will be noted that the outer periphery 28 of the washer is of sufficiently large diameter so that this cannot pull out between the inwardly bent upper edges of the shoe.

In Fig. 2 I illustrate the device being attached to a leg of an article of furniture such leg being indicated by the numeral 29, this being indicated as a wooden leg in which the nail has a smooth cylindrical shank 30 with a sharpened point 31. In the construction of Fig. 3 the nail is illustrated as having a roughened body surface 32 with a rather dull point 33.

In driving these types of glides on the legs of wooden furniture, a hammer may be utilized to strike hammer blows on the base of the shoe and the point of the nail bearing against the wood of the leg causes the nail head to be brought into engagement with the inner surface of the metal part of the shoe and thus the hammer blow is administered sufficiently directly to the head of the nail. This causes the nail to pierce the wood and in such action the resilient body material above the upper edge of the shoe and the lower surface of the leg is compressed; this leaving a small annular ring of compressed material such as rubber 34. When the nail is driven sufficiently tight the resilient expanding action of the body material causes a slight outward movement of the tube relative to the leg and this brings the head of the nail into engagement with the washer so that the holding stresses are transmitted from the nail to the washer and thence to the resilient body material. This action retains the head of the nail out of contact with the metal shoe and thereby greatly reduces the noise of moving furniture by sliding with the glides over the floor.

In Fig. 4 I illustrate a metal leg 35 which has a flat horizontal bend 36 at the bottom. In this case the glide is secured in position by a bolt 37. The head 38 of the bolt engages the underside of the washer and the bolt is drawn tight by the nut 39. This also gives a compression to the rubber so that there is no danger of the bolt head coming in contact with the base of the shoe.

In the construction of Fig. 7 I show a spring socket 40 suitable for engaging a caster stem and to cooperate with this I employ a caster stem 41 which has an upwardly tapering portion 42 with an enlarged head 43 and at the bottom has a head 44 engaged by the washer 45. This washer preferably has an upwardly pressed central portion 46. In this case I prefer to use the resilient or rubber filling in two pieces, there being a bottom piece 47 and an upper piece 48. In this construction the washer is molded in the upper section of the rubber body, then the stem 41 is inserted through the washer and through the upper portion of the rubber body and subsequently thereto the lower portion of the rubber body is fitted in place before the assembly is placed in the cup-shaped shoe. The inward bending of the marginal edges of the shoe compresses the upper and lower sections of the rubber. In this case the glide is held in position by the stem 41 which is of the same type as used in casters engaging in the caster stem socket 40, but in this case the rubber in the annular reduced or neck portion 34 is not compressed.

It will be seen from this construction that the rubber for the main part is well protected from the air and light, it being almost completely enclosed in the cup-shaped washer and as the air is excluded there is practically no opportunity for oxizidation which causes rubber to deteriorate when exposed to the air. The small annular neck is exposed to the air but this is a comparatively small amount of the total rubber filling.

My construction allows a type of swiveling action to be developed should a chair or the like having my glides mounted therein, be tilted, for in such action there is sufficient resiliency of the rubber so that the shoe tends to maintain a flat surface on the floor, this compressing the rubber of the neck slightly more on one side than the other and causing a slight tilting or inclined action of the nail or bolt holding device. This prevents marring of the floor by the marginal edge of the glide giving too small a supporting area when the article of furniture is tilted.

Various changes may be made in the principles of my invention without departing from the spirit thereof as set forth in the description, drawings and claims.

I claim:

1. A furniture glide comprising a cushion member having a body and a reduced upwardly extending neck, a shoe fitting over the body and having its sides extending inwardly over the top of the body toward the neck, a washer in the body of the cushion member above the bottom thereof, and a retaining member having a head below the washer and a shank loosely extending therethrough providing for attachment to an article of furniture, the looseness between the shank and washer permitting a degree of tilting action to take place between the retaining member and the washer, cushion member, and shoe.

2. A furniture glide comprising a cushion member having a body and a reduced upwardly extending neck, a shoe fitting over the body and having its sides bent inwardly over the top of the body toward the reduced neck, a washer disposed in the cushion member above the bottom thereof, a retaining member having a head beneath the washer and a shank extending upwardly through the washer and the neck providing for attachment to an article of furniture, there being an aperture in the bottom of the cushion member exposing the head to the shoe, so that on applying the glide by hammering the head may come in direct contact with the shoe.

3. A furniture glide comprising a cushion member having a recessed bottom, a retaining member having a shank extending upwardly through the cushion member and having a head disposed in the recess, and a shoe having a bottom and sides mounted on the cushion member in such a manner that substantially all the compression transmitted by the shoe to the cushion member will be transmitted by its bottom only, whereby on applying a force to the bottom of the shoe the cushion member may be compressed sufficiently to allow the shoe to come in direct contact with the head.

In testimony whereof I have signed my name to this specification.

WALTER RALEIGH DARNELL.